United States Patent [19]

Araki et al.

[11] Patent Number: 4,667,254
[45] Date of Patent: * May 19, 1987

[54] ELECTRONIC PRINT BOARD

[75] Inventors: Seiji Araki; Joji Tadokoro, both of Tokyo, Japan

[73] Assignee: Oki Electric Industry Co., Ltd., Tokyo, Japan

[*] Notice: The portion of the term of this patent subsequent to May 6, 2003 has been disclaimed.

[21] Appl. No.: 739,461

[22] Filed: May 30, 1985

[30] Foreign Application Priority Data

Jun. 4, 1984 [JP] Japan .................. 59-113021

[51] Int. Cl.⁴ .................................. H04N 1/10
[52] U.S. Cl. .................. 358/293; 358/289; 358/291; 434/411; 434/412; 434/416; 434/428
[58] Field of Search ............... 358/289, 291, 292, 293, 358/256, 294, 285; 434/428, 408, 409, 411, 413, 412, 416, 426, 427, 429, 430, 433; 250/578, 563, 559

[56] References Cited

U.S. PATENT DOCUMENTS

| | | | |
|---|---|---|---|
| Re. 29,067 | 12/1976 | Watson | 358/293 |
| 3,483,511 | 12/1969 | Rabinow | 358/293 |
| 4,054,884 | 10/1977 | Nelson | 358/291 |
| 4,196,452 | 4/1980 | Warren et al. | 358/293 |
| 4,440,491 | 4/1984 | Takahama | 358/291 |
| 4,449,152 | 5/1984 | Kurata et al. | 358/293 |
| 4,486,787 | 12/1984 | Gocho et al. | 358/213 |
| 4,587,568 | 5/1986 | Takayama et al. | 358/293 |

FOREIGN PATENT DOCUMENTS 59-111462 6/1984 Japan .

Primary Examiner—Edward L. Coles, Sr.
Attorney, Agent, or Firm—Wenderoth, Lind & Ponack

[57] ABSTRACT

An electronic print board which includes driving and support rollers rotatably mounted on a frame, an endless belt trained over the rollers, and a writing medium having a flat writing surface, wrapped around the rollers on the endless belt so as to substantially entirely surround the belt to thereby form an endless band-shaped screen. Fixing mediums are provided on the rear surface of the writing medium and the belt to removably mount the writing medium on the belt. A readout sensor receives light reflected from a picture image on the writing medium to provide a readout picture image to a recorder which records the picture image on recording paper. The exposed surface of the writing medium may be erasably written upon by, for example, a felt pen so that the writing medium may be repeatedly reused and easily detached and replaced when worn.

3 Claims, 3 Drawing Figures

ELECTRONIC PRINT BOARD

BACKGROUND OF THE INVENTION

1. Field of the Invention

The present invention relates to an electronic print board provided with an endless writing medium.

2. Description of the Related Art

A prior art electronic copy board is disclosed in U.S. Ser. No. 588,548 (Japanese patent application No. 44 283/83) filed by the present applicant.

An electronic print board is used in conferences, explanation meetings, and preliminary meetings, etc.

The electronic print board allows various results yielded with the progress of a conference, contents of a preliminary arrangement, or information such as symbols and figures and the like, to be written thereon through, and displays them for participants. These pieces of information are written, on a large-sized writing medium provided with a scene movable by a roller, by means of a writing tool such as an aqueous felt pen. In addition, these pieces of information can be scaled down onto a recording paper, copied on the required number of sheets, and distributed to participants. There is known a writing medium used for such an electronic copy board, which is endlessly formed and movable in circulation by the rotation of a roller. However, a writing medium used for such an electronic print board is easily deteriorates on its surface upon use for a prescribed period of time because of its special processing. Accordingly, it has a drawback that it becomes impossible to be used.

SUMMARY OF THE INVENTION

It is an object of the present invention to provide an improved electronic print board.

Another object of the present invention is to provide an electronic print board provided with a writing medium easy to be replaced.

According to the present invention, the above objects can be achieved by an electronic print board comprising a band-shaped writing medium, a roller for moving said writing medium, an endless belt trained around said roller, the belt being made of rubber, etc., a fixing means for removably mounting the writing medium, one end of the fixing means being fixed on the surface of the endless belt, and the other end being fixed on both ends of the back of the writing medium, the writing medium being endlessly mounted on the surface of said endless belt along the outer circumference of the belt by the fixing means.

According to the aforesaid means, the writing medium is mounted on the endless belt by a fixing tool, so that it can be easily demounted from or mounted on the endless belt upon its replacement.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
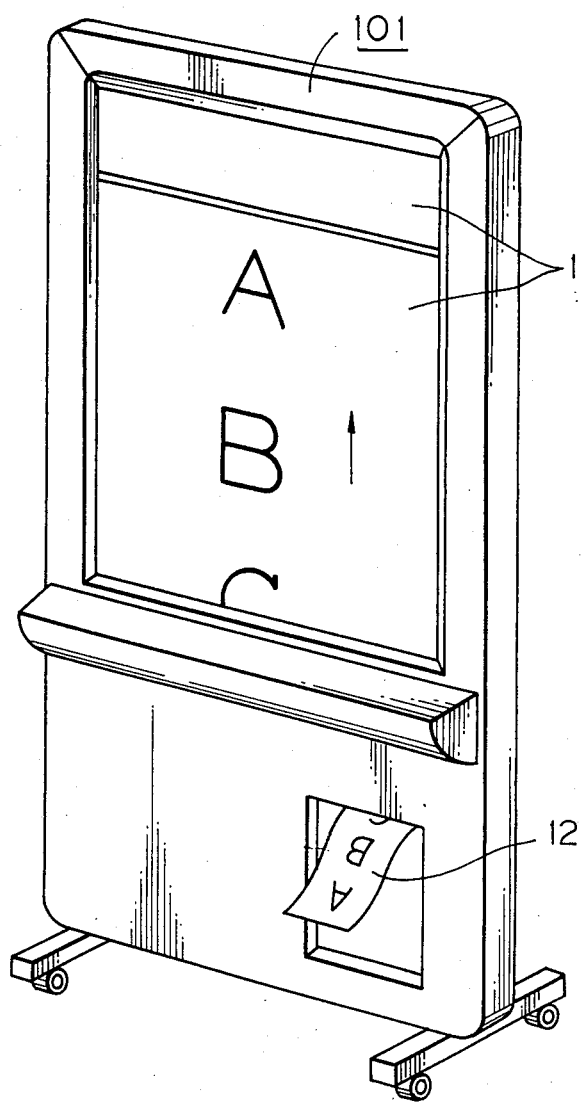
FIG. 1 is a perspective view illustrating an embodiment of an electronic print board provided with an endless writing medium according to the present invention.
Figure 2:
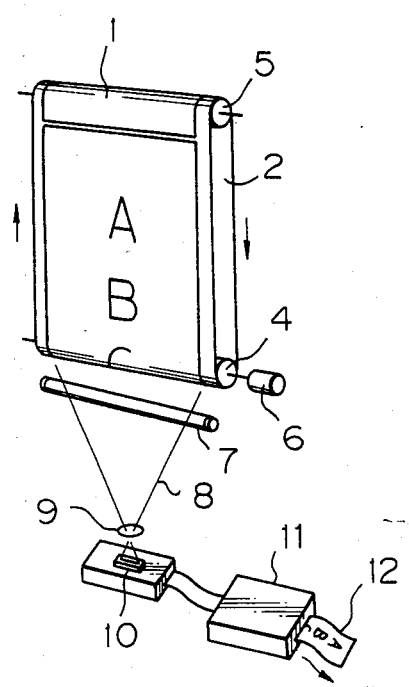
FIG. 2 is a perspective view of a portion of the internal structure of the electronic print board of FIG. 1.
Figure 3:
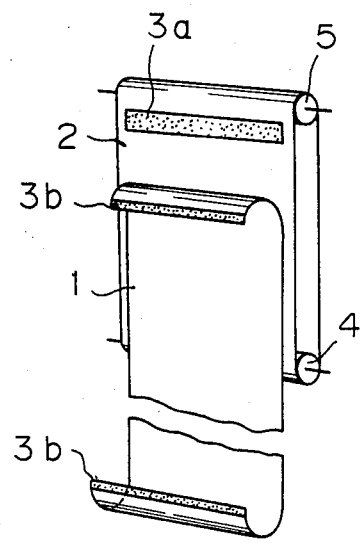
FIG. 3 is a perspective view when the writing medium has been removed from the endless belt.

Designated by reference numeral 101 in FIGS. 1, 2 and 3 is the body or housing of an electronic print board which electronic print board includes an endless belt 2, fixing means or mediums 3a and 3b, a driving roller 4, a support roller 5, a motor 6 for rotating said driving roller 4, a fluorescent lamp 7 serving as a light source for producing a beam of light 8, a lens 9, a readout sensor 10, a recording device 11 equipped with a thermal head, etc., and a recording paper 12.

The driving roller 4 and support roller 5 are supported on a frame of a device, etc., (not illustrated) spaced at a prescribed interval, and an endless belt 2 is trained around the driving roller 4 and the support roller 5. The endless belt 2 is rotated by the driving roller 4 in the direction of the arrow. One of the fixing means 3a is fixed on an arbitrary portion of the endless belt, and the other fixing means 3b is fixed on both ends of the back of the writing medium 1. A magic fastener for detachably and reattachably attaching writing medium 1 to endless belt 2 is employed as these fixing means 3a, 3b. Fixing means 3a is the male portion of the fastener, and fixing means 3b forms the female portion. The writing medium 1 is removably mounted on the endless belt 2 by training the medium 1 substantially entirely around the endless belt 2 along its length and permitting said fixing means 3a and 3b to engage with each other, so as to form a band-shaped screen.

The writing medium 1 is obtained by putting a fluorine film on, e.g., a milk-white opaque whitened polyester film and joining them. With the fluorine film, it is possible to write a picture image thereon by an aqueous felt pen, etc., and to easily erase the picture image therefrom with cloth, etc. The writing medium 1 is the same as or slightly narrower in its width than the endless belt 2, is exposed on a flat surface through an opening in the body 101, and is sized in its length to be equal to the longitudinal length of the endless belt 2.

Further, parts from 7 to 12 are equal to those described in the aforesaid Japanese patent application No. 44 283/83.

With this construction, any picture image such as a character, a numeral and a figure, etc., is written on the writing medium 1 by a writing tool. When scaling down the written picture image and recording it on recording paper 12, rotation of the driving roller 4 by the motor 6 allows the movement of the endless belt 2 toward the fluorescent lamp 7, causing the writing medium 1 mounted on the endless belt 2 to move with the belt.

The fluorescent lamp 7 successively illuminates the approaching writing medium at a prescribed position, and the reflected ray beam of light 8 is projected onto the readout sensor 10 via the lens 9, allowing the image to be read out. The readout image is recorded on the recording paper 12 through the recording device 11, and thereafter the paper 12 15 sent out from the device.

The feature of the embodiment is described below.

When the writing medium 1 used as described above has served its time and become worn due to its use over a long period of time, or when subjected to any external force and destroyed, it must be replaced with a new one. In that case, it is possible to remove the writing medium 1 from the endless belt 2 as shown in FIG. 3 by separating the fixing means 3b on one end of the writing medium 1 from the fixing means 3a of the endless belt 2, and after moving the belt 2 and turning it one revolution, separating the fixing means 3b on the other end of the writing medium 1.

After removing the writing medium 1 from the endless belt 2 in such a way, by fixing the fixing means 3b on one end of a new writing medium 1 on the fixing means 3a of the endless belt 2, and moving the belt 2 and turning it one revolution, the writing medium 1 is trained around the belt 2 along its surface. Further, by allowing the fixing means 3b on the other end of the writing medium 1 to be engaged with the fixing means 3a, it is made possible to endlessly mount the writing medium 1 as shown in FIG. 2.

Further, although in the embodiment described above, the fixing means 3a was fixed on the endless belt 2 at its one position, and the fixing means 3b was fixed on both ends of the writing medium 1, the fixing of the fixing means 3a at plural positions on the endless belt 2 and corresponding thereto, the fixing of the fixing means 3b on the writing medium 1 enable portions other than the ends of the writing medium 1 to be also fixed on the endless belt 2, thus assuring securer mounting thereof. Further, although the fixing means 3a and 3b illustrated in the figures extends in the longitudinal moving directions of both the writing medium 1 and the endless belt 2, transversely extending fixing means may be also used.

In addition, although in the embodiment described above a picture image written on the writing medium 1 is read out by the readout sensor 10, and any information recorded on the recording paper 12 is recorded through a recording device 11 equipped with a thermal head, it may be also possible to use an electrophotographic recording means instead of such a recording means.

What is claimed is:

1. An electronic print board, comprising
   a frame;
   a driving roller and a supporting roller rotatably mounted to said frame in vertical alignment;
   an endless belt trained over said driving roller and said supporting roller so as to be movable thereon by said driving roller;
   a writing medium wrapped around said driving roller and said supporting roller on said endless belt so as to substantially entirely surround said endless belt, said writing medium having a writing surface on one entire side thereof to thereby form an endless band-shaped screen having a flat writing surface portion extending between said driving roller and said supporting roller, said writing surface being formed of a material receptive of and permitting easy erasure of picture images applied thereto with a writing instrument;
   attaching means for detachably and reattachably attaching said writing medium to said endless belt, said attaching means including a first attachment member on said endless belt and a second attachment member on a rear surface of said writing medium detachably and reattachably attached to said first attachment member;
   means, including a light source and a lens, for directing light onto said writing medium and through said lens to form a reduced scale image of a picture image on said writing medium;
   a readout sensor, disposed so as to receive said reduced scale image, said sensor including means, responsive to said reduced scale image, for providing a readout picture image; and
   recording means, connected to said readout sensor and responsive to said readout picture image, for recording a picture image on a recording paper.

2. An electronic print board comprising
   a frame;
   a driving roller and a supporting roller rotatably mounted to said frame;
   an endless belt trained over said driving roller and said supporting roller so as to be movable thereon by said driving roller;
   a writing medium wrapped around said driving roller and said supporting roller on said endless belt so as to substantially entirely surround said endless belt, said writing medium having a writing surface on one entire side thereof to thereby form an endless band-shaped screen having a flat writing surface portion extending between said driving roller and said supporting roller, wherein said writing surface is receptive of and permits easy rubbing off of picture images applied thereto with a felt pen, said flat writing surface portion extending in a vertical plane;
   means, including a light source and a lens, for directing light onto said writing medium and through said lens to form a reduced scale image of a picture image on said writing medium;
   readout sensor, disposed so as to receive said reduced scale image, said sensor including means, responsive to said reduced scale image, for providing a readout picture image; and
   recording means, connected to said readout sensor and responsive to said readout picture image, for recording a picture image on a recording paper.

3. An electronic print board comprising
   a frame;
   a driving roller and a supporting roller rotatably mounted to said frame;
   an endless belt trained over said driving roller and said supporting roller so as to be movable thereon by said driving roller;
   a writing medium wrapped around said driving roller and said supporting roller on said endless belt so as to substantially entirely surround said endless belt, said writing medium having a writing surface on one entire side thereof to thereby form an endless band-shaped screen having a flat writing surface portion extending between said driving roller and said supporting roller;
   a print board body housing said frame, said supporting roller, said driving roller, said endless belt and said writing medium therein, said frame having an opening exposing said flat writing surface portion therethrough so that said flat writing surface portion can be written upon through said opening;
   means, including a light source and a lens, for directing light onto said writing medium and through said lens to form a reduced scale image of a picture image on said writing medium;
   a readout sensor, disposed so as to receive said reduced scale image, said sensor including means, responsive to said reduced scale image, for providing a readout picture image; and
   recording means, connected to said readout sensor and responsive to said readout picture image, for recording a picture image on a recording paper.

* * * * *